(12) United States Patent
Boehler et al.

(10) Patent No.: US 9,942,185 B2
(45) Date of Patent: *Apr. 10, 2018

(54) HYPERLINK VALIDATION

(71) Applicant: International Business Machines Corporation, Armonk, NY (US)

(72) Inventors: Olivier Boehler, Montpellier (FR); Matthieu Debeaux, Montpellier (FR); Ivan Deleuze, Montpellier (FR); Guilhaume Garcia, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,985

(22) Filed: Sep. 7, 2016

(65) Prior Publication Data

US 2017/0208026 A1 Jul. 20, 2017

Related U.S. Application Data

(63) Continuation of application No. 15/000,420, filed on Jan. 19, 2016, now Pat. No. 9,473,440.

(51) Int. Cl.
*G06F 15/16* (2006.01)
*H04L 12/58* (2006.01)
*H04L 29/08* (2006.01)

(52) U.S. Cl.
CPC .......... *H04L 51/18* (2013.01); *H04L 67/2861* (2013.01); *H04L 67/02* (2013.01)

(58) Field of Classification Search
CPC ..... H04L 12/58; H04L 12/589; H04L 12/585; H04L 51/00; H04L 51/12; H04L 51/18; H04L 51/043; H04L 29/06; H04L 67/00

(Continued)

(56) References Cited

U.S. PATENT DOCUMENTS 6,601,066 B1 7/2003 Davis-Hall
7,171,481 B2 1/2007 Hayashi et al.
(Continued)

FOREIGN PATENT DOCUMENTS

CN 102025559 7/2012
WO 2008056063 A3 5/2008

OTHER PUBLICATIONS

Validating messages, WebSphere Message Broker, Version 8.0.0.6 Operating Systems: AIX, HP-Itanium, Linux, Solaris, Windows, zIOS, Retrieved on Dec. 8, 2015, 4 pages.
(Continued)

*Primary Examiner* — Frantz Jean
(74) *Attorney, Agent, or Firm* — Schmeiser, Olsen & Watts, LLP; Isaac Gooshaw

(57) ABSTRACT

A method and associated computer system. A composed message portion, of an electronic message, that includes a hyperlink is sent to a set of content rendering emulators. Each emulator is configured to emulate a rendering of content accessible through the hyperlink on a respective particular platform. An emulation result is received from the set of content rendering emulators. The emulation result is indicative of the emulated rendering of the content accessible through the hyperlink on the respective particular platforms emulated by the content rendering emulators. It is determined whether the emulation result indicates that the content accessible through the hyperlink can be rendered in accordance with defined rendering criteria on at least one of the respective platforms prior to transmission of a message including the message portion, and if so then a validation message is generated, and if not then a warning message is generated.

18 Claims, 6 Drawing Sheets

(58) Field of Classification Search
USPC .................................................. 709/206, 219
See application file for complete search history.

(56) References Cited

U.S. PATENT DOCUMENTS

| | | | |
|---|---|---|---|
| 7,689,667 B2 | 3/2010 | Lal | |
| 8,074,162 B1 | 12/2011 | Cohen | |
| 8,255,491 B1* | 8/2012 | Arzur | G06F 17/30867 |
| | | | 709/203 |
| 8,326,941 B2 | 12/2012 | Aviles Sanchez et al. | |
| 8,666,996 B2 | 3/2014 | Kondasani | |
| 8,838,719 B1* | 9/2014 | Faulk | H04L 51/043 |
| | | | 709/203 |
| 2005/0015626 A1 | 1/2005 | Chasin | |
| 2008/0256187 A1* | 10/2008 | Kay | H04L 12/585 |
| | | | 709/206 |
| 2009/0019313 A1* | 1/2009 | Pokala | G06F 9/4443 |
| | | | 714/37 |
| 2009/0327407 A1* | 12/2009 | Gropper | G06Q 30/02 |
| | | | 709/203 |
| 2010/0235636 A1* | 9/2010 | Cohen | G06F 9/44526 |
| | | | 713/168 |
| 2013/0061120 A1 | 3/2013 | Zeine et al. | |
| 2014/0380145 A1* | 12/2014 | Wilsher | H04L 12/287 |
| | | | 715/234 |
| 2015/0100894 A1* | 4/2015 | Kumar | H04L 12/5825 |
| | | | 715/752 |
| 2015/0206198 A1* | 7/2015 | Marshall | G06Q 30/0276 |
| | | | 705/14.72 |
| 2015/0288781 A1* | 10/2015 | Hewitt | H04L 63/10 |
| | | | 709/217 |
| 2016/0119376 A1* | 4/2016 | Scozzaro | H04L 63/168 |
| | | | 726/22 |

OTHER PUBLICATIONS

Validating Message Content Before Launch, Retrieved on Jul. 28, 2015, 2 pages.
Office Action (dated May 9, 2016) for U.S. Appl. No. 15/000,420, filed Jan. 19, 2016.
Amendment (dated Jun. 9, 2016) for U.S. Appl. No. 15/000,420, filed Jan. 19, 2016.
Notice of Allowance (dated Jul. 11, 2016) for U.S. Appl. No. 15/000,420, filed Jan. 19, 2016.

* cited by examiner

HYPERLINK VALIDATION

This application is a continuation application claiming priority to Ser. No. 15/000,420 filed Jan. 19, 2016, now U.S. Pat. No. 9,473,440, issued Oct. 18, 2016.

TECHNICAL FIELD

The present invention relates generally to electronic messages, and more specifically to validation of a hyperlink in an electronic message.

BACKGROUND

Electronic communication forms an integral part of modern society. For example, electronic communication is commonly used to share information. Such information may include one or more hyperlinks in an electronic message (referred to hereinafter as "message") to provide the one or more recipients of the message access to content via the one or more hyperlinks without having to provide this content in the actual message.

A recipient of the message can properly access the content via the one or more hyperlinks. Increasingly, users access such messages using heterogeneous message viewing tools, both in terms of hardware and software.

For example, an increasing number of different types of devices are being used to view the message and access the content hyperlinked in such a message; e.g., desktop computers, laptop computers, tablet computers, mobile phones, wearable smart devices such as smart watches, and so on.

In addition, an increasing number of operating systems may be used to view the message and access the content hyperlinked in such a message. Different security rules or different security rule settings may be applied by different users using different devices, different operating systems and/or different content viewers such as rules that accept or reject cookies, etc.

SUMMARY

The present invention provides a method and associated computer system and computer program product. One or more processors receive a composed message portion of an electronic message, the composed message portion including a hyperlink.

The one or more processors send the composed message portion to a set of content rendering emulators, each emulator configured to emulate a rendering of content accessible through the hyperlink on a respective particular platform.

The one or more processors receive an emulation result from the set of content rendering emulators, the emulation result being indicative of the emulated rendering of the content accessible through the hyperlink on the respective particular platforms emulated by the content rendering emulators.

The one or more processors determine whether the emulation result indicates that the content accessible through the hyperlink can be rendered in accordance with defined rendering criteria on at least one of the respective platforms prior to transmission of a message including the message portion, and if so then the one or more processors generate a validation message, and if not then the one or more processors generate a warning message.

BRIEF DESCRIPTION OF THE DRAWINGS

Embodiments of the present invention will now be described, by way of example only, with reference to the following drawings.

DETAILED DESCRIPTION

Figure 1:
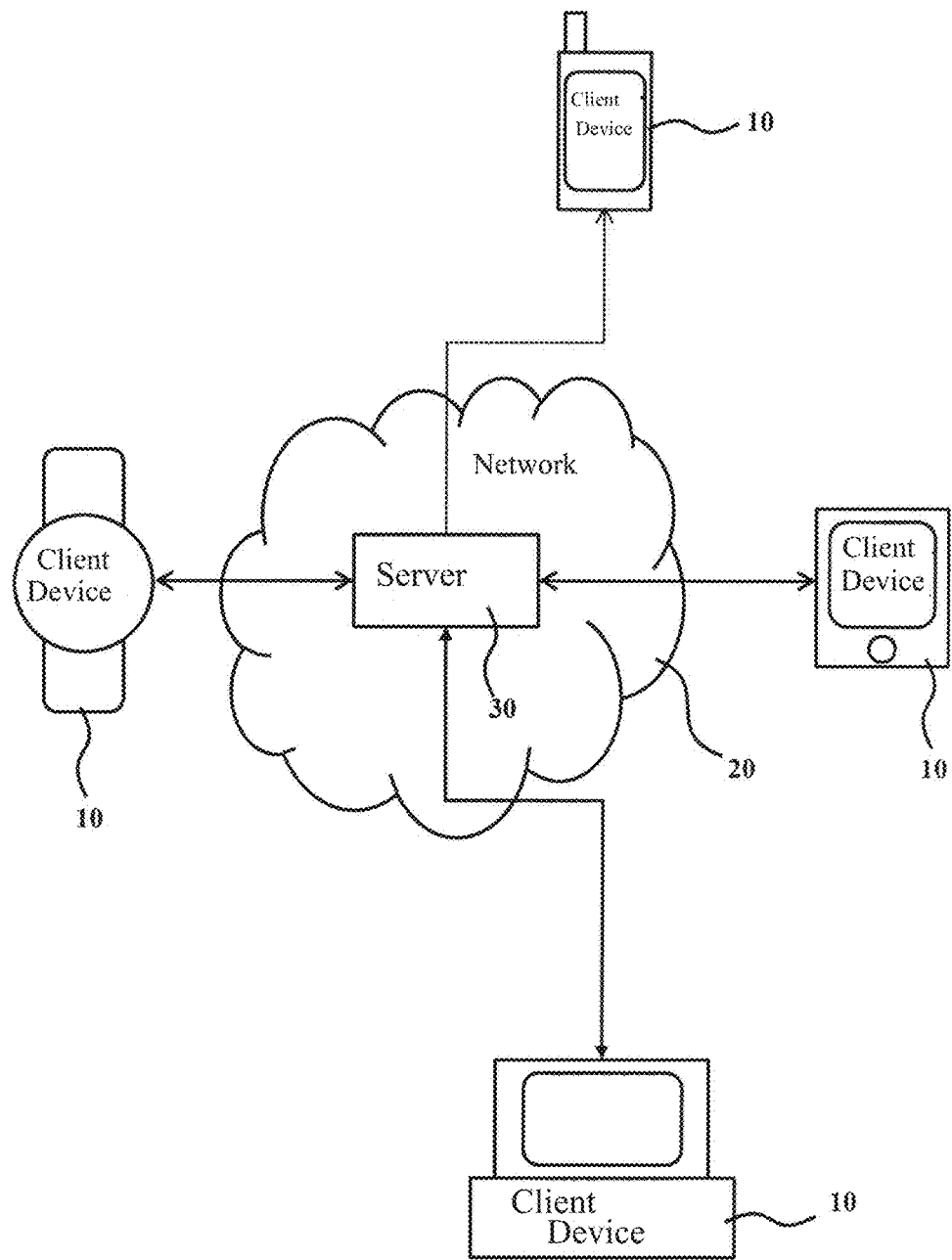
FIG. 1 depicts a computer system including client devices and a message handling server, in accordance with embodiments of the present invention.

It should be understood that the Figures are merely schematic and are not drawn to scale. It should also be understood that the same reference numerals are used throughout the Figures to indicate the same or similar parts.

Embodiments of the present invention are concerned with providing a computer-implemented method, a computer program product and a computer system that facilitate hyperlink validation in an electronic message.

In the context of the present application, where embodiments of the present invention constitute a method, it should be understood that such a method is a process for execution by a computer; i.e., is a computer-implementable method. The various steps of the method therefore reflect various parts of a computer program; e.g., various parts of one or more algorithms.

There is a risk that a message containing one or more hyperlinks cannot be properly displayed on a recipient device because the recipient device is incapable of properly rendering the content accessible through one or more hyperlinks in the message. This risk is undesirable in a scenario where the author of the message requires the message to be shared amongst many recipients (e.g., a business or social community) to deploy information captured in the hyperlinked content, because such a message is likely to be ignored or discarded by the recipient because the content is not rendering properly on a recipient's device. This risk also reduces the likelihood that the recipient will forward the message to other recipients and as such hampers the dissemination of information captured in the hyperlinked environment in which electronic messages are communicated.

FIG. 1 depicts a computer system including client devices 10 and a message handling server 30, in accordance with embodiments of the present invention. In FIG. 1, a heterogeneous pool of client devices 10 communicates with the message handling server 30 over a network 20, such as the Internet or the like in a wired or wireless manner. By way of non-limiting example, the client devices 10 shown in FIG. 1 include (from the top in a clockwise manner) a smart phone, a tablet computer, a desktop computer and a smart watch. These are examples of typical client devices that can be used to display messages on a display of such devices, but where the different sizes of the displays of the various client devices 10, the different operating systems of the various client devices 10, the different content viewing software (e.g., web browsers) operating on the different client devices 10 and/or the different security settings applied by the operating systems and/or content viewing software, may cause content to be rendered differently across the various client devices 10.

If the various client devices 10 try to access content identified in a message by way of a hyperlink to that content, the content may open correctly on some but not all of the client devices 10. For example, an invalid hyperlink may cause the content to not correctly display, or not display at all, on any of the client devices 10, which may be particularly problematic where the composer of a message including such a hyperlink relies on the various users of the recipient client devices 10 to access the content for the hyperlink in the message (e.g., for information sharing purposes) and/or relies on these recipient device users to forward (share) the message with as many other users as possible; for example, in a social media context. A recipient receiving, or otherwise accessing, a message comprising a bad hyperlink (that is, a hyperlink causing the incorrect rendering of content on the recipient client device 10 or otherwise preventing the correct rendering of the content on the recipient client device 10; e.g., a broken hyperlink), is unlikely to consider such a message a relevant message and is therefore unlikely to pass such a message on to other users; e.g., share such a message with other users.

Figure 2:
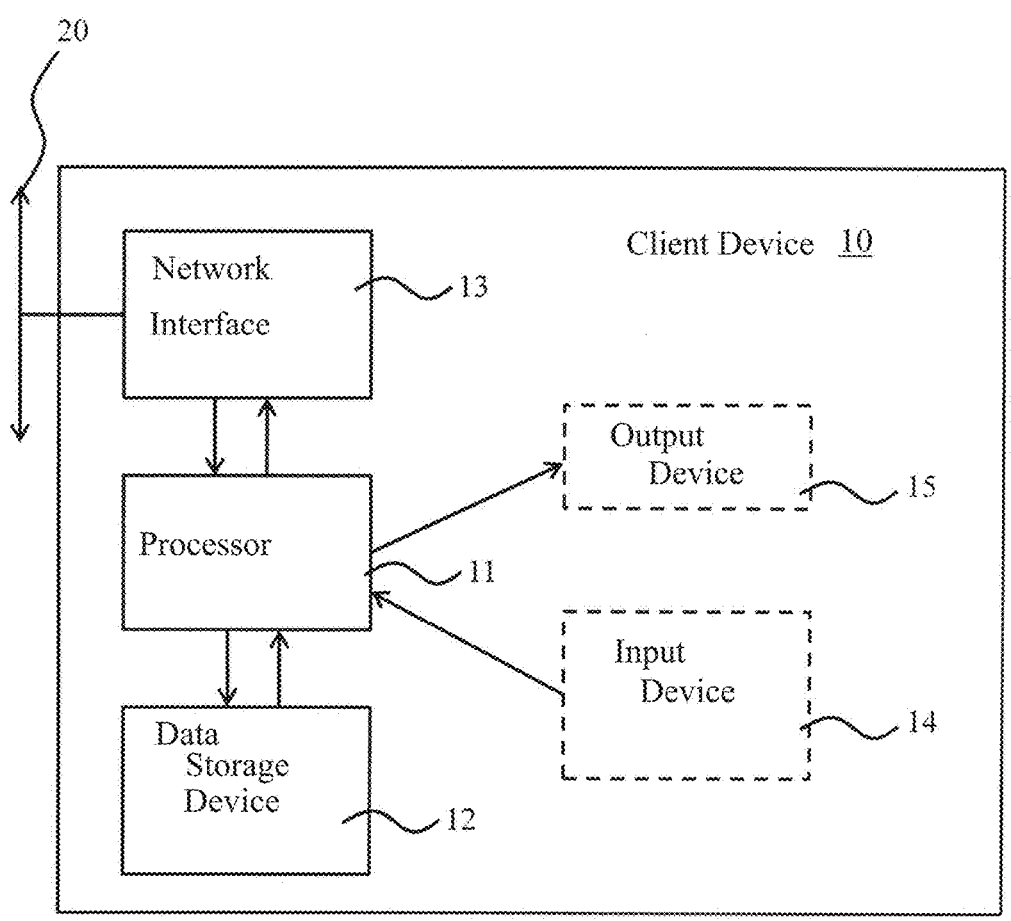
FIG. 2 schematically depicts a client device of FIG. 1, in accordance with embodiments of the present invention.

FIG. 2 schematically depicts a client device 10 of FIG. 1, in accordance with embodiments of the present invention. The client device 10 includes one or more processors 11 that are configured to execute computer program code stored in a computer readable medium data storage of one or more storage devices 12 such as a memory, a hard disk drive, a distributed storage device such as a network attached storage (NAS) or a storage area network (SAN), and so on. To this end, the one or more processors 11 may be configured to communicate with the one or more data storage devices 12 in any suitable form; e.g., over dedicated connections, a bus architecture, a data network, and so on. The computer program code, when executed on the one or more processors 11, causes the client device 10 to implement at least some the steps of one or more of the embodiments of the methods of the present invention as will be explained in more detail below.

The client device 10 may further include a network interface 13 for communicating an electronic message with an external system and/or a user; e.g., via one or more networks 20. In one embodiment, the one or more networks 20 may not form part of the client device 10. The network interface 13 may take any suitable shape; e.g., one or more network cards, a wireless communication interface such as a Wi-Fi® or Bluetooth® interface, an interface configured to communicate in accordance with a mobile communication standard such as 2G, 3G, 4G or 5G by way of non-limiting example, and so on.

The client device 10 may further include one or more input devices 14; e.g., a keyboard, a mouse, a trackball, a microphone for voice recognition control, a scroll wheel, a touch screen, and so on. The client device 10 may include one or more output devices 15; e.g., a display device, loudspeakers, printer, and so on. The input device(s) 14 and output device(s) 15 may be connected to the client device 10 in any suitable manner; e.g., in a wired manner using proprietary connectors or standard connectors or in a wireless manner using a wireless communication protocol such as Bluetooth® by way of non-limiting example.

Figure 3:
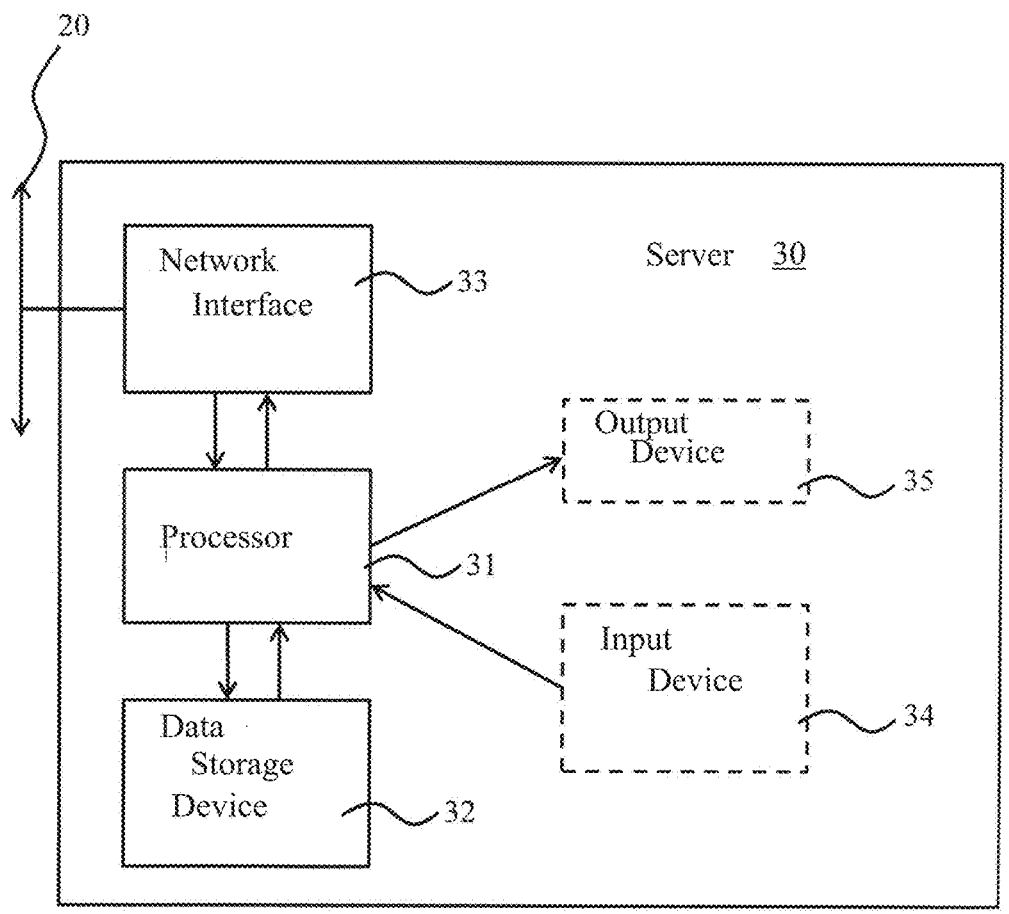
FIG. 3 depicts the message handling server of FIG. 1, in accordance with embodiments of the present invention.

FIG. 3 depicts the message handling server 30 of FIG. 1, in accordance with embodiments of the present invention. The message handling server 30 includes one or more processors 31 that are configured to execute computer program code stored in a computer readable medium data storage of one or more data storage devices 32 such as a memory, a hard disk drive, a distributed storage device such as a NAS or a SAN, and so on. The one or more processors 31 may communicate with the one or more data storage devices 32 in any suitable form; e.g., over dedicated connections, a bus architecture, a data network, and so on. The computer program code, when executed on the one or more processors 31, causes the message handling server 30 to implement at least some the steps of one or more of the embodiments of the methods of the present invention as will be explained in more detail below.

The message handling server 30 may further include a network interface 33 for communicating an electronic message with an external system and/or a user; e.g., via one or more networks 20. In one embodiment, the one or more networks 20 may not form part of the message handling server 30. The network interface 33 may take any suitable form; e.g., one or more network cards, a wireless communication interface such as a Wi-Fi® or Bluetooth® interface, an interface configured to communicate in accordance with a mobile communication standard such as 2G, 3G, 4G or 5G by way of non-limiting example, and so on.

The message handling server 30 may further include one or more input devices 34; e.g., a keyboard, a mouse, a trackball, a microphone for voice recognition control, a scroll wheel, a touch screen, and so on. The message handling server 30 may further include one or more output devices 35; e.g., a display device, loudspeakers, printer, and so on. The input device(s) 34 and output device(s) 35 may be connected to the message handling server 30 in any suitable manner; e.g., in a wired manner using proprietary connectors or standard connectors or in a wireless manner using a wireless communication protocol such as Bluetooth® by way of non-limiting example.

In an embodiment, the message handling server 30 may be a message server configured to receive a message such as an e-mail from one of the client devices 10 and to transmit the received message to one or more recipient client devices 10. The message handling server 30 may provide a communication service accessible to the client devices 10 over the network 20, such as a social media service. In this embodiment, a user of a client device 10 may access the message handling server 30 to generate (post) a message on the message handling server 30 for access by one or more users of recipient client devices 10. Non-limiting examples of such social media services include Twitter®, Facebook®, Whatsapp®, Linked-In®, and so on.

According to embodiments of the present invention, hyperlinks in electronic messages generated within the architecture of FIG. 1 are validated prior to the message being made accessible by recipients of the message; i.e., in one embodiment, prior to sending the message, a validation process may check whether the content accessible through the hyperlink will correctly render across a set of platforms likely to be used by the recipients.

In one embodiment, sending a message may include transferring a message from a client device 10 to a message handling server 30; for example, by the compiler of the message issuing a "send" command on the client device 10, posting a message on a message forum such as a social media service, and so on. Any action by the compiler of the message that makes the message available to intended recipients of the message is considered sending a message.

In this context, a platform may include a user device 10 having a particular set of parameters for rendering content, such as at least one of user device type, user device display size, user device operating system, user device web browser, user device operating system settings, user device web browser settings, and so on. Generally speaking, the term 'platform' may relate to any user device-dependent parameters that influence the rendering of content on the user device 10.

Figure 4:
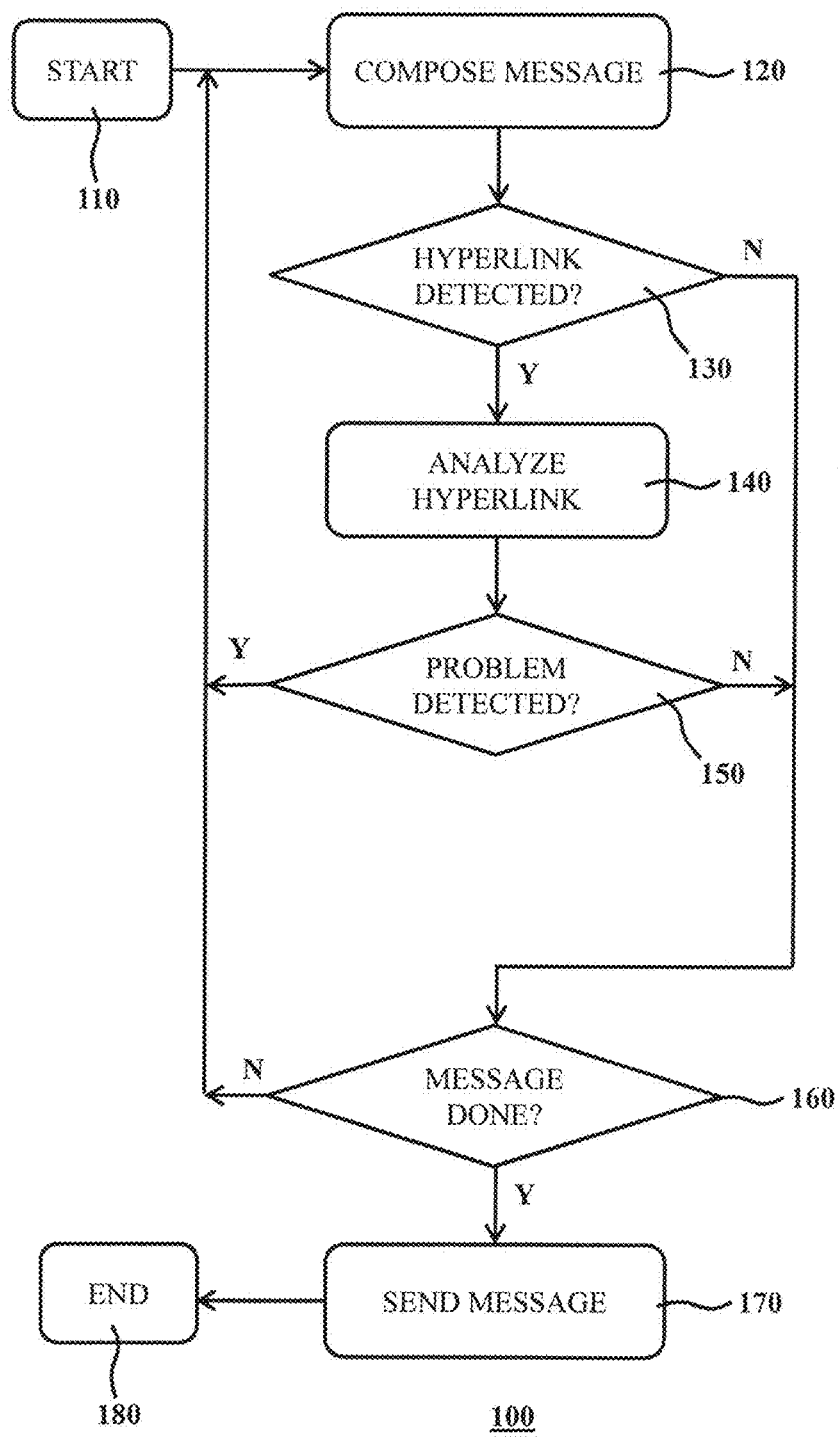
FIG. 4 is a flowchart of a message validation method, in accordance with embodiments of the present invention.

FIG. 4 is a flowchart of a message validation method 100, in accordance with embodiments of the present invention. The message validation method 100 validates a hyperlink in an electronic message. The method 100 starts in step 110 with a user starting up a service with a client device 10 allowing the user to compose an electronic message (hereinafter, 'message') using the client device 10. In one embodiment, the service may be a messaging program such as an e-mail client running on the client device 10 or may be a remote service such as a service hosted by a message handling server 30, in which case the user may access the remote service over the network 20 using the client device 10; e.g., by logging into the remote service.

The user subsequently proceeds to step 120 in which the user composes a message for distribution to one or more recipients of the message in order to allow the client device 10 to receive the message; e.g., a message including a message portion comprising a hyperlink to be validated. The message may be composed in any suitable manner; e.g., using any suitable input device such as a keyboard, a touchpad, speech recognition software, and so on. In step 130, the method 100 checks to determine whether the completed portion of the message composed by the user contains a hyperlink to content at an address specified by the hyperlink; e.g., an Internet address specified by a hyperlink in the form of a uniform resource locator (URL), a hyperlink to content on a document server, and so on. If no such hyperlink is detected in step 130, the method proceeds to step 160, which will be explained in more detail below. In contrast, if in step 130 a hyperlink is detected in the checked message portion, the method 100 proceeds to step 140 to check whether the content accessible via the hyperlink can be correctly rendered across a selection of platforms. Step 140 is described in more detail with the aid of FIG. 5.

Figure 5:
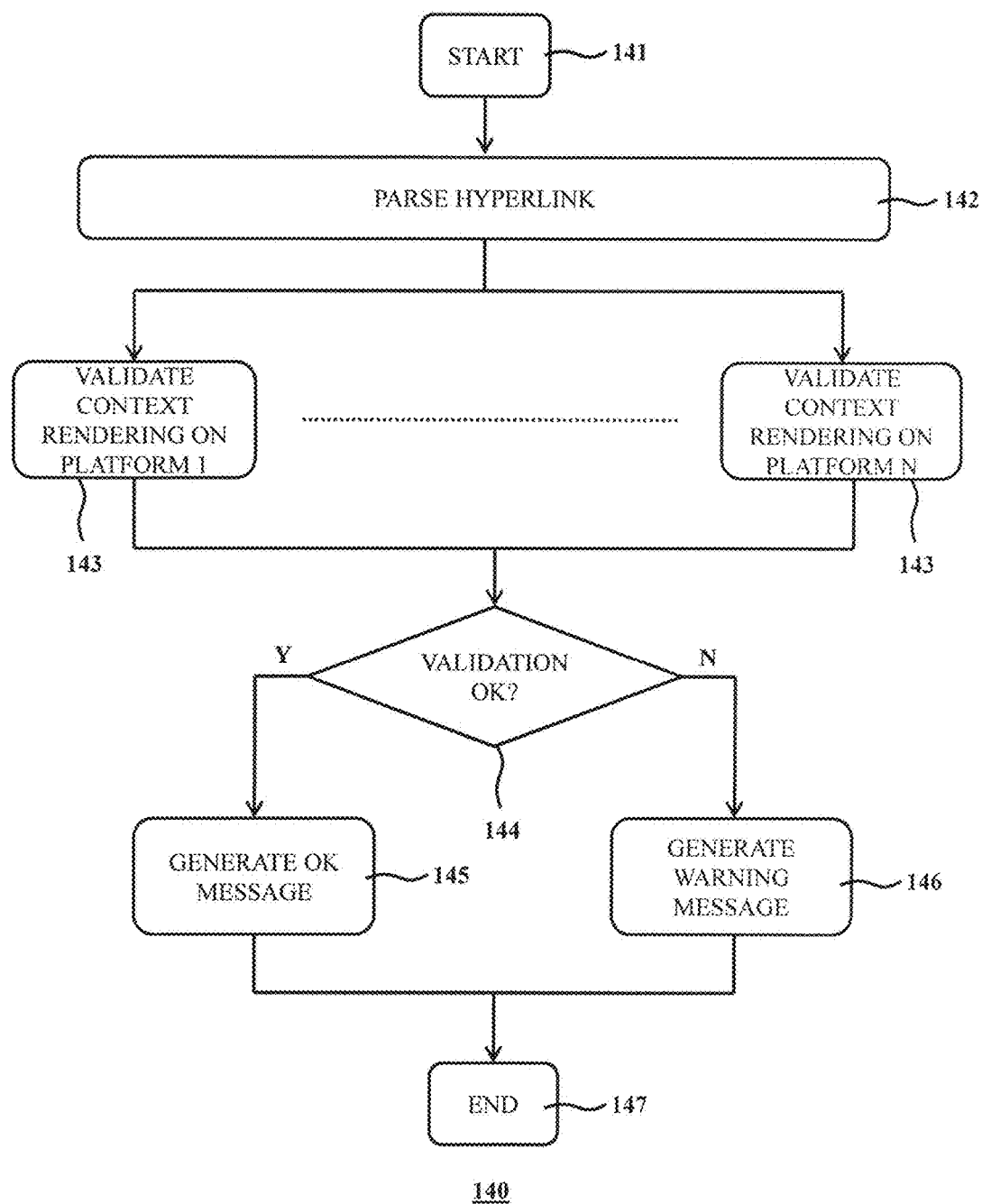
FIG. 5 is a flowchart describing an embodiment of a step of analyzing a hyperlink in FIG. 4, in accordance with embodiments of the present invention.

FIG. 5 is a flowchart describing an embodiment of step 140 of FIG. 4, of analyzing the hyperlink, in accordance with embodiments of the present invention. Analysis of the hyperlink in FIG. 5 employs a content rendering verification, beginning in step 141 with the provision of a set of content rendering emulators configured to emulate the rendering of content accessible through the hyperlink on a particular platform. In the context of the present application, a content rendering emulator is a software program that emulates the rendering of content on, inter alia: at least one of a particular user device type, a user device having a particular display size, a user device having a particular operating system, a user device utilizing a particular web browser, a user device employing particular operating system settings, or a user device employing particular web browser settings. Such content rendering emulators may be provided as a remote service (e.g., as a cloud service) or as a local service (e.g., as an integral part of a message editor).

Non-limiting examples of such content rendering emulators may include an emulator for content validation on an Android® device, an emulator for content validation on a MacOS (IOS)® device, an emulator for content validation on a Windows® device, an emulator for content validation in an Internet Explorer web browser, an emulator for content validation in a Google Chrome® web browser, an emulator for content validation in a Safari web browser, an emulator for content validation on a particular model of an IPhone®, Android® phone, Windows phone, IPad®, Android® Tablet, Windows tablet, laptop computer, desktop computer, and so on. In some embodiments, content rendering emulators emulating combinations of such platforms (e.g., a particular device having a particular operating system on which a particular web browser is installed) are equally feasible. Such emulators are well-known per se, and the skilled person will have no difficulty obtaining or developing such emulators. Therefore, for the sake of brevity, such emulators will not be explained in further detail.

In step 141, a predefined set of content rendering emulators may be provided. Alternatively, a list of such content rendering emulators may be provided; e.g., on a display of the client device 10 of the composer of the message. In this embodiment, the composer of the message may select content rendering emulators to be used in the verification process of the message, in which case the set of content rendering emulators to be used in this verification process is user-defined, which may be advantageous in a scenario where the composer has a priori knowledge of the various platforms used by the recipients of the message being composed. In step 141, the message portion comprising the hyperlink to be validated is sent to the set of content rendering emulators which, as will be explained in more detail below, may be a set of content rendering emulators hosted by the client device 10 or provided as a remote service; e.g., hosted by a remote server.

In step 142, the hyperlink is parsed. In step 143, the provided set of content rendering emulators emulate the rendering of the content identified by the hyperlink in order to determine if the content can be rendered on the platforms emulated by these content rendering emulators in accordance with defined rendering criteria. These criteria typically define whether the content is considered to have rendered correctly on the emulated platform, or at least without errors that would cause the content to be inaccessible or illegible for a recipient using the emulated platform. In step 143, the set of content rendering emulators may further generate an emulation result indicative of the emulated rendering of the content accessible through the hyperlink on the respective particular platforms emulated by the content rendering emulators, and this emulation result is sent to the client device 10 in case of remote content rendering emulators, or this emulation result is sent to the appropriate program running on the client device 10 in case of the content rendering emulators running on the client device 10.

In FIG. 5, the content rendering verification process performs N emulations with N content rendering emulators in parallel, wherein N is an integer having a value of at least 2. It should be understood that this is by way of non-limiting example only and that these emulations may be performed in any suitable manner; e.g., completely serially or in part serially and in part in parallel.

Step 144 determines whether each content rendering emulator was capable of rendering the content accessible by the hyperlink in accordance with the defined rendering criteria; e.g., whether each content rendering emulator was capable of correctly rendering the content on the emulated platform of each content rendering emulator such as by evaluating the emulation result received from the set of content rendering emulators. If so (i.e., Y branch from step 144), then step 145 generates a validation message for display on the client device 10 of the composer of the message, the validation message indicating that the hyperlink inserted into the message may be correctly rendered across a heterogeneous pool of platforms emulated by the content rendering emulators. Alternatively, the generation of such a validation message may be skipped such that the composer of the message will understand that the absence of a validation message within a specified period of time implies that the hyperlink inserted into the message may be correctly rendered across a heterogeneous pool of platforms.

If step 144 determines that for at least some of the platforms emulated by the set of content rendering emulators, the content accessible by the hyperlink cannot be rendered on these platforms in accordance with the defined rendering criteria (i.e., N branch from step 144), the content rendering verification process may proceed to step 146 in which a warning message is generated for display on the client device 10 of the composer of the message, the warning message indicating that the content associated with hyperlink inserted into the message cannot be correctly rendered on at least one of the target platforms. This warning message for instance may be used by the composer of the message to investigate the suitability of the hyperlink; e.g., by accessing the hyperlink using a number of different platforms, and inserting an alternative hyperlink to the content that does not suffer from such rendering problems. The content rendering validation process may terminate in step 147.

In an embodiment, the content rendering validation process may further check if the hyperlink in the message portion under investigation is a broken link; i.e., no content can be accessed through this hyperlink, which for instance may form part of the emulation (step 143) or the validation check (step 144) by way of non-limiting example. Alternatively, the content rendering validation process may include one or more additional steps for checking if the hyperlink under investigation is a broken link. The one or more additional steps may be inserted into the content rendering validation process in any suitable location and may include the generation of a further warning message indicative of the hyperlink being broken; e.g., invalid. Alternatively, the warning message generated in step 146 may contain information pertaining to platform specific rendering problems as well as information pertaining to invalidity of the hyperlink.

As will be explained in further detail below, the content rendering validation process may be performed in its entirety on the client device 10 on which the message is composed, or may be at least in part performed on a separate device such as the message handling server 30 or a remote server providing a content rendering validation service. In an example embodiment, the client device 10 on which the message is composed may extract the identified hyperlink from the message being composed and transmit the identified hyperlink to the separate device; e.g., over the network 20. The separate device (e.g., the message handling server 30 or a remote server providing a content rendering validation service) may host the respective content rendering emulators configured to emulate the rendering of the content accessible by the identified hyperlink on a particular platform and perform the emulation, emulation analysis and message generation. The separate device is further configured to send the generated message (if any) to the client device 10 on which the message is composed to provide the composer of the message with the indication of the hyperlink inserted in the message being composed being suitable for rendering across a heterogeneous pool of platforms and/or being valid; e.g., by sending an emulation result to the client device 10 in which the message is composed over the network 20. The emulation result may be indicative of the emulated rendering of the content accessible through the hyperlink on the respective particular platforms emulated by the content rendering emulators and/or may include an appropriate validation or warning message to be provided to the client device 10.

Returning to method 100 as depicted by the flowchart in FIG. 4, step 150 determines whether the analysis of the content rendering of the content accessible to the hyperlink, which was performed in 140, has flagged a problem; e.g., by the generation of a warning message or a further warning message as explained above with respect to step 146 in FIG. 5. If such a problem has been flagged (i.e., Y branch from step 150), method 100 may revert back to step 120 in which the user may evaluate and rectify (e.g., replace) the problematic hyperlink as previously explained. On the other hand, if no such problem has been flagged (i.e., N branch from step 150), method 100 may proceed to step 160 in which it is checked whether the user has completed composition of the message. In one embodiment, completion of composition of the message in step 160 may be checked by determining whether a user is attempting to issue a command triggering the sending (e.g. posting) of the composed message. If the user is not attempting to send the message (i.e., N branch from step 160), the user may still be composing the message; e.g., generating further message portions of the message, such that the method 100 returns to step 120. Such further message portions may contain further hyperlinks which may be subsequently identified and analyzed as explained above.

If it is determined in step 160 that the user attempts to send the message (i.e., Y branch from step 160), the message may be sent in step 170; e.g., by sending the message to a message handling server 30, by posting the message onto a message board or message forum hosted by the message handling server 30, and so on as previously explained. The method 100 may terminate in step 180.

It should of course be understood that a composer of a message to be sent may decide to send the message including a potentially problematic hyperlink; i.e., FIG. 4 should not be construed to imply that the composer of the message can only send the message in step 170 if all hyperlinks in the message are valid and the content accessible through the hyperlinks can be correctly rendered across a plurality of platforms emulated by the content rendering emulators in the content rendering emulating process of FIG. 5. For example, the problem detection evaluation in step 150 may contain a query asking a composer of the message under verification if, in case of a problem being detected, the user wants to rectify the detected problem with the verified hyperlink. If the composer indeed wants to rectify the detected problem, method 100 may revert back to step 120 in which the user may continue composing the message, or if the composer indicates that the error should not be rectified, method 100 may proceed to step 160 instead, in which the detected problem is ignored. Alternatively, method 100 may revert back to step 120, for example if the composer has not yet completed composition of the message, but the problematic hyperlink is ignored in the further validation of the message being composed. Other suitable ways of allowing the composer to send a message in step 170 containing a potentially problematic hyperlink will be immediately apparent to the skilled person and are considered to form part of the teachings of the present application.

In one embodiment in FIG. 4, the content rendering verification is performed during composition of the message to be sent. In one embodiment, the content rendering verification may be performed at any suitable point prior to sending the message.

Figure 6:
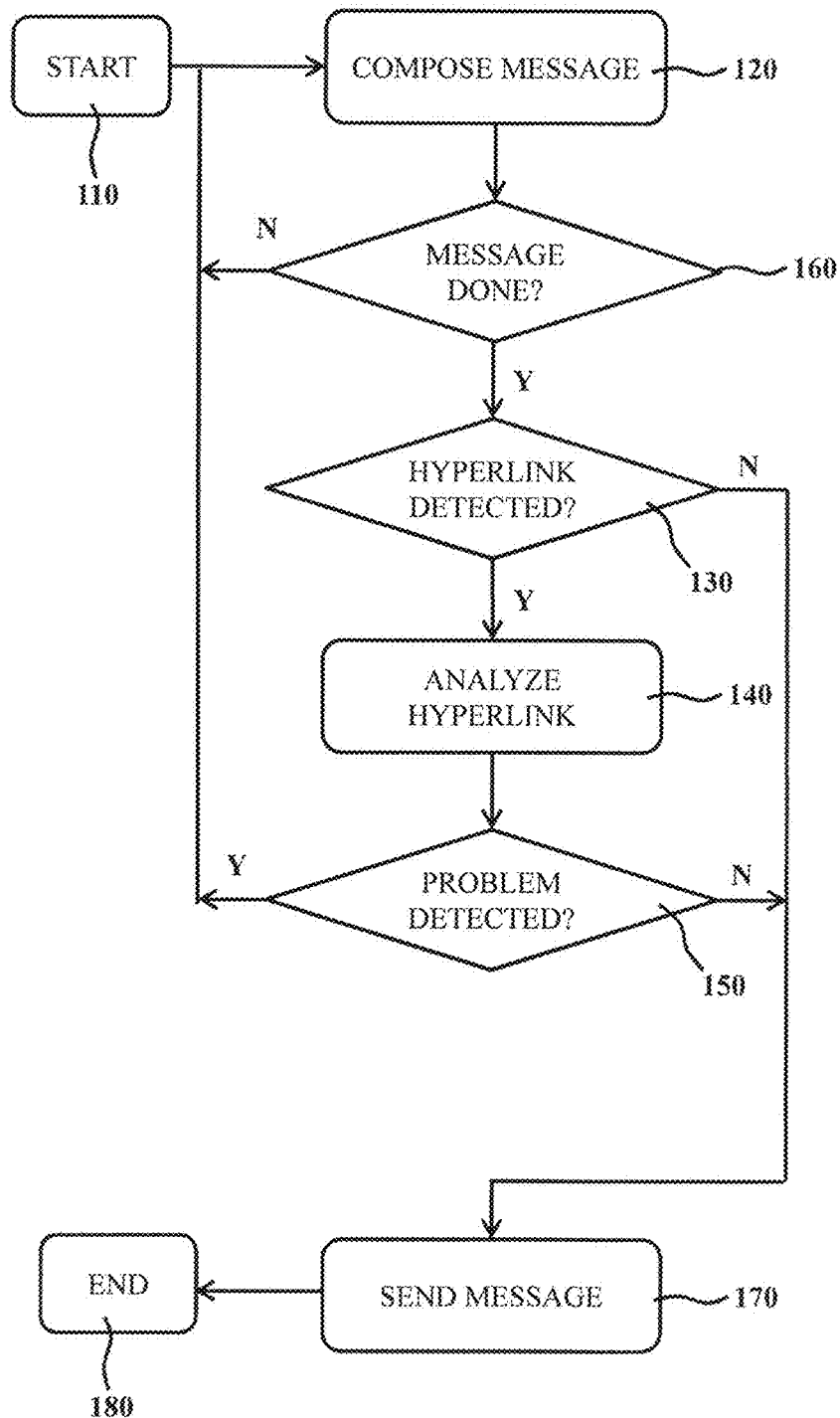
FIG. 6 is a flowchart of an alternative message validation method, in accordance with embodiments of the present invention.

FIG. 6 depicts a flowchart of an alternative message validation method, in accordance with embodiments of the present invention. The various steps of the method depicted in FIG. 6 are identical to the steps of the method 100 depicted in FIG. 4, but are ordered differently, and the description of the various steps will not be repeated.

A difference between the embodiments of the method 100 depicted in FIG. 4 and the method in FIG. 6 is that in FIG. 4 and FIG. 6, the composition of the message to be verified is completed in step 160 after and prior to, respectively, the detection of hyperlinks and the verification of the detected hyperlinks. As mentioned before, the detection of the completion of the composition of the message 160 may be performed in any suitable manner, for example by the composer of the message attempting to send the message.

In both FIG. 4 and FIG. 6, if it is detected in step 150 that at least one of the hyperlinks in the composed message is problematic in terms of rendering of the content accessible to the hyperlink on at least one of the emulated platforms and/or in terms of hyperlink validity, the method may revert back to step 120 in which the composer of the message may correct the problem as previously explained. Alternatively, the composer may choose to ignore the identified problem as previously explained and proceed with sending the message in step 170.

The above embodiments of the computer-implemented method may be embodied by a computer system comprising a processor arrangement communicatively coupled to a computer readable storage medium having computer readable program instructions embodied therewith for, when executed on the processor arrangement, cause the processor arrangement to implement the above embodiments of the computer-implemented method. The computer readable storage medium may embody a computer program product having computer readable program instructions which, when executed on the processor arrangement, cause the processor arrangement to implement the above embodiments of the computer-implemented method.

A computer system according to embodiments of the present invention may be embodied by a client device 10, a message handling server 30 or a combination thereof. In an embodiment, the computer implemented method is implemented by a client device 10, for example as part of a mail client running on the client device 10, in which the hyperlink verification is performed on the client device 10.

In another embodiment, the computer system is implemented by the message handling server 30, with a user using the client device 10 to access the message handling server 30 over the network 20, but generating the message and verifying the one or more hyperlinks in the message with the message handling server 30. In this embodiment, the message handling server 30 communicates warning and/or verification messages indicative of the (in)correct rendering of content accessible through the one or more hyperlinks to the client device 10 for displaying on a display of the client device 10.

In yet another embodiment, the computer system is implemented as a distributed computer system in which the message generation is performed on the client device 10 but the hyperlink validation is performed on the message handling server 30 or on a remote server providing a hyperlink validation service. In this embodiment, the client device 10 communicates an identified hyperlink in a message being composed to the remote server; i.e., the message handling server 30, or the remote server providing the hyperlink validation service for remote validation, receives warning and/or verification messages indicative of the correct or incorrect rendering of content accessible through the one or more hyperlinks from the remote server. Other suitable embodiments will be immediately apparent to the skilled person and it should be understood that such alternative embodiments are contemplated to fall within the teachings of the present application.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method, said method comprising:

sending, by one or more processors at a client device of a computer system, a composed message portion of an electronic message to each emulator of N emulators, said composed message portion comprising a hyperlink that links to an address at which content is stored, N being at least 2, each emulator configured to emulate a rendering of the content on a respective particular platform that is uniquely different for rendering the content for each emulator;

said one or more processors receiving, from each emulator of the N emulators, an emulation result specific to each emulator, said emulation result being either a first emulation result indicating that the emulator was able to render the content or a second emulation result indicating that the emulator was unable to render the content;

said one or more processors ascertaining whether the emulation results received from the N emulators is the first emulation result for each emulator, and if so then said one or more processors generating and displaying at the client device a validation message indicating that the content may be correctly rendered across a heterogeneous pool of platforms emulated by the emulators, and if not then said one or more processors generating and displaying at the client device a warning message indicating that the content may not be correctly rendered across the heterogeneous pool of platforms emulated by the emulators.

2. The method of claim 1, said method comprising:
said one or more processors sending the composed message portion to the set of content rendering emulators during composition of the electronic message including the message portion.

3. The method of claim 1, said method comprising:
said one or more processors sending the composed message portion to the N emulators in response to a user attempting to send the electronic message including the message portion.

4. The method of claim 1, said method further comprising:
said one or more processors generating a list of emulators;
said one or more processors displaying the list of emulators on a display device of a user composing the electronic message; and said one or more processors receiving a user selection of emulators from the list of emulators, the user selection of emulators defining the N emulators.

5. The method of claim 1, wherein said sending the composed message portion to the N emulators comprises transmitting the hyperlink to a remote server hosting the N emulators, said method further comprising:
said one or more processors receiving the emulation result from the remote server.

6. The method of claim 1, said method comprising:
in response to said ascertaining having ascertained that the emulation results received from the N emulators is the first emulation result for each emulator and after said displaying the validation message and after completion of the electronic message, said one or more processors sending the electronic message to a message handling server for subsequent transmission of the electronic message to one or more recipient devices; or
in response to said ascertaining having ascertained that the emulation results received from the N emulators is not the first emulation result for each emulator and after said displaying the warning message, said one or more processors inserting into the composed message portion an alternative hyperlink that links to another address at which the content is stored.

7. A computer program product, comprising one or more computer readable hardware storage devices having computer readable program code stored therein, said program code containing instructions executable by one or more processors at a client device of a computer system to implement a method, said method comprising:
said one or more processors sending a composed message portion of an electronic message to each emulator of N emulators, said composed message portion comprising a hyperlink that links to an address at which content is stored, N being at least 2, each emulator configured to emulate a rendering of the content on a respective particular platform that is uniquely different for rendering the content for each emulator;
said one or more processors receiving, from each emulator of the N emulators, an emulation result specific to each emulator, said emulation result being either a first emulation result indicating that the emulator was able to render the content or a second emulation result indicating that the emulator was unable to render the content;
said one or more processors ascertaining whether the emulation results received from the N emulators is the first emulation result for each emulator, and if so then said one or more processors generating and displaying at the client device a validation message indicating that the content may be correctly rendered across a heterogeneous pool of platforms emulated by the emulators, and if not then said one or more processors generating and displaying at the client device a warning message indicating that the content may not be correctly rendered across the heterogeneous pool of platforms emulated by the emulators.

8. The computer program product of claim 7, said method comprising:
said one or more processors sending the composed message portion to the set of content rendering emulators during composition of the electronic message including the message portion.

9. The computer program product of claim 7, said method comprising:

said one or more processors sending the composed message portion to the N emulators in response to a user attempting to send the electronic message including the message portion.

10. The computer program product of claim 7, said method further comprising:
said one or more processors generating a list of emulators;
said one or more processors displaying the list of emulators on a display device of a user composing the electronic message; and
said one or more processors receiving a user selection of emulators from the list of emulators, the user selection of emulators defining the N emulators.

11. The computer program product of claim 7, wherein said sending the composed message portion to the N emulators comprises transmitting the hyperlink to a remote server hosting the N emulators, said method further comprising:
said one or more processors receiving the emulation result from the remote server.

12. The computer program product of claim 7, said method comprising:
in response to said ascertaining having ascertained that the emulation results received from the N emulators is the first emulation result for each emulator and after said displaying the validation message and after completion of the electronic message, said one or more processors sending the electronic message to a message handling server for subsequent transmission of the electronic message to one or more recipient devices; or
in response to said ascertaining having ascertained that the emulation results received from the N emulators is not the first emulation result for each emulator and after said displaying the warning message, said one or more processors inserting into the composed message portion an alternative hyperlink that links to another address at which the content is stored.

13. A computer system, comprising a client device, one or more processors at the client device, one or more memories, and one or more computer readable hardware storage devices, said one or more hardware storage device containing program code executable by the one or more processors via the one or more memories to implement a method, said method comprising:
said one or more processors sending a composed message portion of an electronic message to each emulator of N emulators, said composed message portion comprising a hyperlink that links to an address at which content is stored, N being at least 2, each emulator configured to emulate a rendering of the content on a respective particular platform that is uniquely different for rendering the content for each emulator;
said one or more processors receiving, from each emulator of the N emulators, an emulation result specific to each emulator, said emulation result being either a first emulation result indicating that the emulator was able to render the content or a second emulation result indicating that the emulator was unable to render the content;
said one or more processors ascertaining whether the emulation results received from the N emulators is the first emulation result for each emulator, and if so then said one or more processors generating and displaying at the client device a validation message indicating that the content may be correctly rendered across a heterogeneous pool of platforms emulated by the emulators, and if not then said one or more processors generating and displaying at the client device a warning message indicating that the content may not be correctly rendered across the heterogeneous pool of platforms emulated by the emulators.

14. The computer system of claim 13, said method comprising:
said one or more processors sending the composed message portion to the set of content rendering emulators during composition of the electronic message including the message portion.

15. The computer system of claim 13, said method comprising:
said one or more processors sending the composed message portion to the N emulators in response to a user attempting to send the electronic message including the message portion.

16. The computer system of claim 13, said method further comprising:
said one or more processors generating a list of emulators;
said one or more processors displaying the list of emulators on a display device of a user composing the electronic message; and
said one or more processors receiving a user selection of emulators from the list of emulators, the user selection of emulators defining the N emulators.

17. The computer system of claim 13, wherein said sending the composed message portion to the N emulators comprises transmitting the hyperlink to a remote server hosting the N emulators, said method further comprising:
said one or more processors receiving the emulation result from the remote server.

18. The computer system of claim 13, said method comprising:
in response to said ascertaining having ascertained that the emulation results received from the N emulators is the first emulation result for each emulator and after said displaying the validation message and after completion of the electronic message, said one or more processors sending the electronic message to a message handling server for subsequent transmission of the electronic message to one or more recipient devices; or
in response to said ascertaining having ascertained that the emulation results received from the N emulators is not the first emulation result for each emulator and after said displaying the warning message, said one or more processors inserting into the composed message portion an alternative hyperlink that links to another address at which the content is stored.

* * * * *